(12) United States Patent
Benedict et al.

(10) Patent No.: US 7,909,558 B2
(45) Date of Patent: Mar. 22, 2011

(54) OVERHEAD VEHICLE STORAGE SYSTEM

(75) Inventors: Charles E. Benedict, Tallahassee, FL (US); Brian G. Pfeifer, Tallahassee, FL (US); Christian A. Yates, Tallahassee, FL (US); Scott K. Bladen, Bristol, FL (US); Richard E. Lackinger, Tallahassee, FL (US); James R. Dobbs, Tallahassee, FL (US)

(73) Assignee: BEC Companies, Inc., Tallahassee, FL (US)

( * ) Notice: Subject to any disclaimer, the term of this patent is extended or adjusted under 35 U.S.C. 154(b) by 0 days.

(21) Appl. No.: 11/743,561

(22) Filed: May 2, 2007

(65) Prior Publication Data

US 2008/0075566 A1    Mar. 27, 2008

Related U.S. Application Data

(60) Provisional application No. 60/826,855, filed on Sep. 25, 2006.

(51) Int. Cl.
    *E04H 6/08* (2006.01)
(52) U.S. Cl. ...................................... 414/234
(58) Field of Classification Search .................. 414/234; 212/328, 346
    See application file for complete search history.

(56) References Cited

U.S. PATENT DOCUMENTS

| | | | |
|---|---|---|---|
| 1,889,112 A * | 11/1932 | Shoemaker | 16/97 |
| 2,440,307 A | 4/1948 | Smith | |
| 2,963,310 A | 12/1960 | Abolins | |
| 3,220,571 A | 11/1965 | Kummerman | |
| 3,252,603 A | 5/1966 | Davis | |
| 3,498,477 A | 3/1970 | Sommer | |
| 3,513,999 A | 5/1970 | Schwartz et al. | |
| 3,558,176 A | 1/1971 | Fathauer et al. | |
| 3,604,743 A | 9/1971 | Kinkopf | |
| 3,687,309 A | 8/1972 | Macrander | |
| 3,860,130 A * | 1/1975 | Frangos | 414/237 |
| 4,043,285 A | 8/1977 | Nordstrom | |
| 4,158,416 A | 6/1979 | Podesta | |
| 4,172,685 A | 10/1979 | Nabeshima et al. | |
| 4,666,356 A | 5/1987 | Newbury | |
| 4,694,531 A * | 9/1987 | Foy | 16/87.4 R |
| 4,732,087 A * | 3/1988 | Morishita et al. | 104/130.02 |
| 4,752,987 A * | 6/1988 | Dreyer et al. | 16/102 |
| 4,973,219 A | 11/1990 | Brickner et al. | |

(Continued)

FOREIGN PATENT DOCUMENTS

DE    3103162    8/1982

(Continued)

*Primary Examiner* — Charles A Fox
(74) *Attorney, Agent, or Firm* — Dowell & Dowell, P.C.

(57) ABSTRACT

A system and method for the safe storage of vehicles wherein a storage structure is provided having a first section in which vehicles are stored in vertically oriented cells with each vehicle being carried within a vehicle storage unit such that the units may be stacked one upon another and wherein at least one transfer vehicle is provided for selectively engaging and conveying the vehicle storage units along an overhead grid track system between the first section and a second section wherein the grid track system is at least partially oriented over a roadway such that the at least one transfer vehicle may be used to either lift or lower a vehicle contained within a vehicle storage unit relative to the roadway and move the vehicle storage unit to and from a storage position in one of the vertical storage cells of the first section of the storage structure.

19 Claims, 16 Drawing Sheets

U.S. PATENT DOCUMENTS

| | | | |
|---|---|---|---|
| 5,213,458 A * | 5/1993 | Preller et al. | 410/26 |
| 5,295,281 A * | 3/1994 | Kordes | 16/95 R |
| 5,314,262 A | 5/1994 | Meisinger et al. | |
| 5,354,112 A | 10/1994 | Hara et al. | |
| 5,380,139 A * | 1/1995 | Pohjonen et al. | 414/280 |
| 5,540,532 A | 7/1996 | Carder et al. | |
| 5,560,663 A | 10/1996 | Hara et al. | |
| 5,769,589 A | 6/1998 | Lubbers | |
| 5,915,906 A | 6/1999 | Lucking et al. | |
| 6,161,887 A | 12/2000 | Shiota et al. | |
| 6,220,173 B1 | 4/2001 | Sauerwein | |
| 6,572,319 B1 | 6/2003 | Simmons, III et al. | |
| 7,203,570 B2 * | 4/2007 | Karlen | 700/213 |
| 2002/0146305 A1 * | 10/2002 | Haag | 414/228 |
| 2005/0220573 A1 | 10/2005 | Benedict et al. | |

FOREIGN PATENT DOCUMENTS

| | | |
|---|---|---|
| EP | 0365086 | 10/1989 |
| JP | 60093006 | 5/1985 |
| JP | 61114905 | 6/1986 |
| JP | 07172317 | 7/1995 |

* cited by examiner

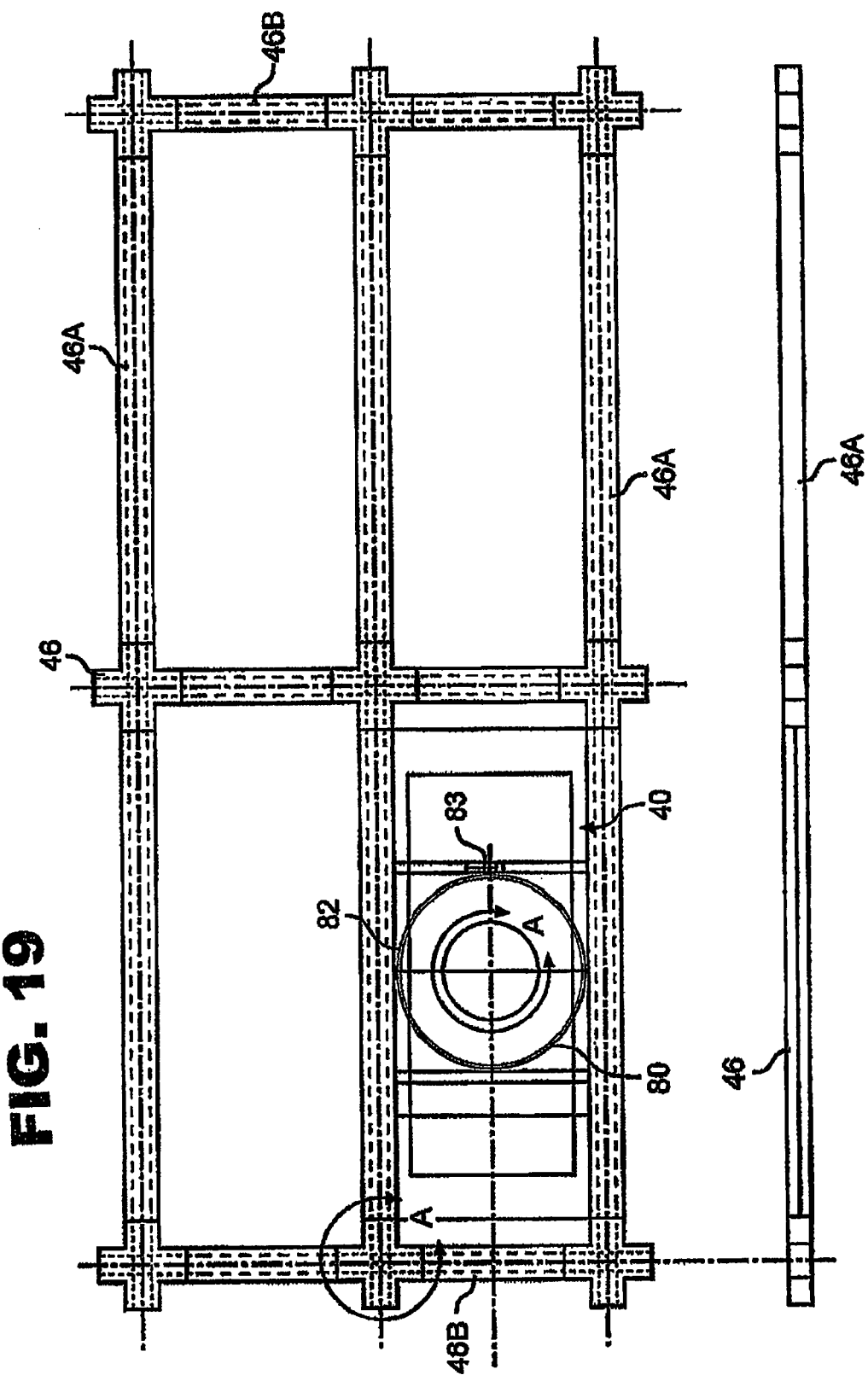

OVERHEAD VEHICLE STORAGE SYSTEM

CROSS-REFERENCE TO RELATED APPLICATIONS

This application claims priority to U.S. provisional application No. 60/826,855, filed on Sep. 25, 2006, entitled "Overhead Vehicle Storage System," which is hereby incorporated by reference in its entirety.

BACKGROUND OF THE INVENTION

1. Field of the Invention

This application is directed to an overhead storage system for automotive vehicles wherein the vehicles are initially driven into storage units after which, with the vehicles locked in position, the storage units or racks are manipulated by one or more overhead transfer units that can lift or elevate the vehicles and maneuver them into a storage area wherein the storage units or racks are stacked in vertically oriented storage cells without the need to use conventional cranes and forklifts and in such a manner as to maximize storage space by eliminating the need for internal aisles for manipulating and/or vehicle handling equipment.

2. Brief Description of the Related Art

In many city and popular resort areas, private vehicle parking space has become an ever increasing problem. The problem is increased in those areas where property values are extremely high such that construction of conventional ramp-like parking garages is not an economically viable prospect. A direct problem that exists due to inadequate parking areas is increased traffic congestion. As motorist are forced to continuously search for parking space, they continue to clog roadways and streets. Lack of sufficient parking is thus a direct contributor to crowded streets and traffic congestion.

Many motorist do not have convenient sources of mass transit to go to their place of employment and many employers do not provide for parking expenses. In city areas where parking spaces are limited, the cost of daily parking can be painfully expensive for many commuters.

In addition to the foregoing, in many areas, parking is at such a premium that apartment, condominium and home owners can not find adequate and safe street parking. Even if a person can walk or take mass transit to and from a job, there is little or no safe areas to store personal or commercial vehicles for days or weeks at a time.

In view of the foregoing, there is a need to provide a parking system that can provide for a maximized parking density for a given area of land wherein vehicles including but not limited to motorcycles, cars and small trucks can be safely parked for either short periods of time or for days or weeks at a time at reasonably economic rates. There is a further need to provide for vehicle parking that is not only secured but which is accessible twenty-four hours a day, seven days a week, year round and wherein vehicles may be automatically stored and retrieved from storage whenever necessary without attendant assistance.

Many people also collect antique or high-end rare vehicles, both of which need to be housed in areas where they are not exposed to harsh environmental conditions, damaging sun light and weather. There is a need to provide safe storage areas for such vehicles that cannot be easily accessed by other people so that such vehicles cannot be damaged or stolen.

As parking space in cities, towns and resort areas becomes increasingly more congested and expensive, there is a need to provide an alternate to such conventional methods of vehicle parking and/or short and long term storage which provides for maximizing the storage/parking capacity of enclosed storage areas to thereby increase the number of safer and preferred enclosed storage facilities but also to make storage systems more cost effective to thereby reduce the storage costs to vehicle owners. Further, there is also a need for a such a vehicle storage system that provides quick and easy stowage and retrieval of vehicles.

SUMMARY

The present invention is directed to an overhead storage system for automotive vehicles that maximizes storage space without the use of internal aisles or cranes, forklifts, or other vehicle handling equipment. The system includes a plurality of overhead transfer units that lift or elevate storage units for containing vehicles. The overhead transfer units move the vehicle storage units throughout a large warehouse structure and stack the storage units in vertically oriented storage cells.

Further, the vehicle storage units allow for quick and easy stowage and retrieval of vehicles. Each vehicle storage unit includes rotating locks that connect an upper part of the storage unit to a lower frame. As such, the locks are disengaged to allow the upper part of the storage unit to be removed from the lower frame so that a vehicle can easily drive into or out of the storage unit. Likewise, the locks can be engaged and lock to allow the upper part of the storage unit to be fixed to the lower frame so that the overhead transfer unit can manipulate the entire storage unit.

BRIEF DESCRIPTION OF THE DRAWINGS

FIG. 19 is a top view showing the transfer unit of FIG. 13 with a trunnion;

FIG. 20 is a side view of the transfer unit of FIG. 19;

DETAILED DESCRIPTION OF THE PREFERRED EMBODIMENTS

Figure 1:
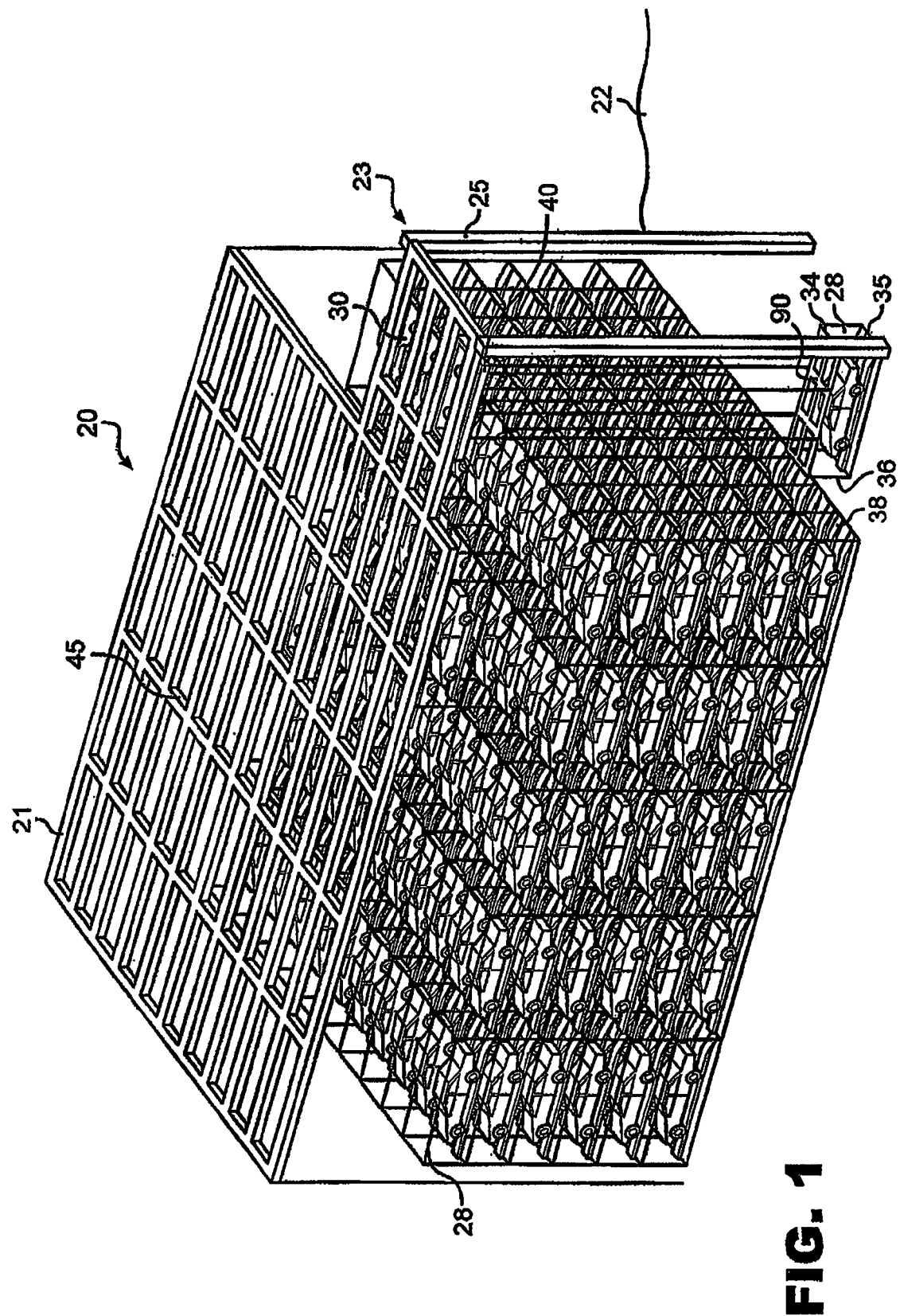
FIG. 1 is a perspective view of an overhead vehicle parking/storage facility in accordance with the teachings of the present invention illustrating a vehicle being driven onto a storage unit or rack that will be elevated and thereafter conveyed into a storage/parking space within an enclosed area by an overhead transfer unit.
Figure 2:
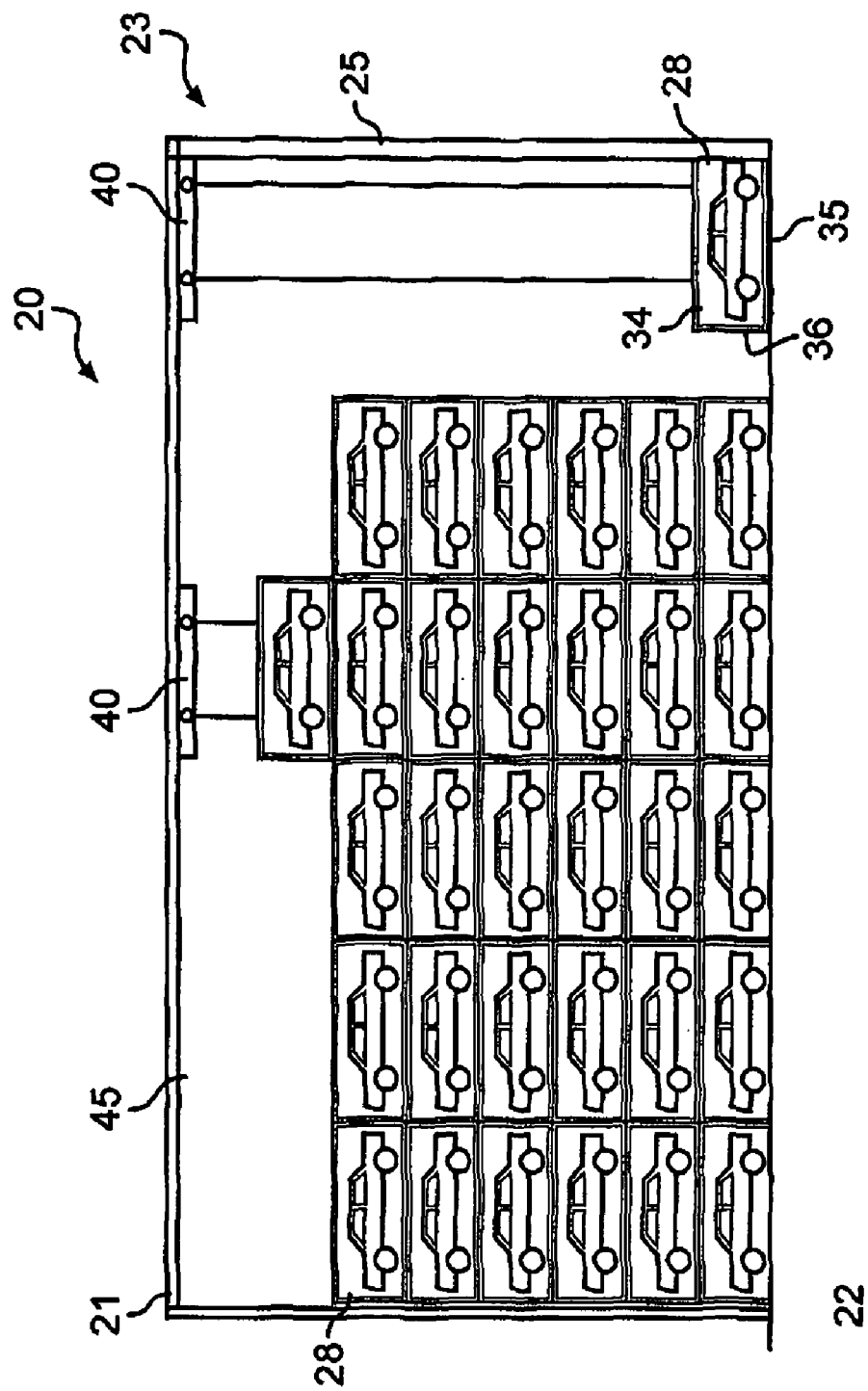
FIG. 2 is a side view of the facility of FIG. 1 on a reduced scale showing the vehicle being positioned within a storage unit or rack and ready for being elevated for movement into the storage/parking facility.

The present invention is directed to facilities and methods for safely and efficiently storing vehicles that allow maximum use to be made of limited areas adjacent roadways. The facilities of the invention are designed and configured to permit a maximum number of vehicles to be stored within a given space and yet easily accessible when needed for use. The facilities described herein are generally fully enclosed structures having outer side walls and roof that protect vehicles being stored from ambient weather conditions with the roof "R" being cut away and walls being removed to facilitate the description of the storage systems. Further, although the facilities described herein are preferably structured to permit vehicles, such as cars, trucks, and sport utility vehicles (SUVs), to be elevated directly from a road when being moved to storage and being directly lowered onto a road for use, the system and facilities may be used to elevate vehicles from trailers or to lower vehicles directly onto vehicles or other vehicles for travel or shipment.

The size of vehicles that can be stored using the teachings of the present invention may vary. Therefore, the use of the term "vehicle" herein is not limited to any specific type or style of vehicle. Generally, however, as the systems are designed to permit vertical storage of the vehicles without the need for individual storage racks or bins, vehicles of generally the same size will generally be vertically stacked relative to one another.

With specific reference to FIGS. 1-6, a vehicle parking/storage facility will be described. In this embodiment, the facility includes a large warehouse-like structure 20 that includes an inner portion 21 that is supported on a solid foundation 22 that may be elevated or built up with respect to an adjacent roadway. The roadway may be a street, driveway, or the like.

In the embodiment shown, a front portion 23 of the structure is built having two spaced vertical columns 25 that face each another so as to define an open vertical cell 30 of a size to guidingly receive the vehicle storage units 28 of the invention as they are raised from or lowered to the roadway. This guidance feature will ensure that vehicles being handled are not accidentally damaged. Further, each of the columns 25 has a cross section defined by one or more vertical guide flanges that are oriented at generally right angles relative to one another so as to define a guide channel (not shown). Corners of special vehicle storage units 28 in which the vehicles are stored are guidingly engageable with the guide channels, as will be described in greater detail hereinafter, as vehicles are elevated from or lowered toward the roadway.

Similarly, in an alternative embodiment, the inner portion 21 of the structure 20 includes similar vertical columns 25 that are spaced to define a plurality of open storage cells 32 in which a plurality of vehicles, each housed within one of the vehicle storage units 28, may be stored in stacked vertical relationship relative to one another. Although each column 25 may have the same cross section, inner columns 25C will preferably have "+" shaped cross sections so as to define four guide channels, while end and side columns 25B will have generally T-shaped cross sections defining two opposing guide channels. Corner columns 25A will preferably have flanges defining a single or L-shaped guide channel.

As shown in FIGS. 1-12, each vehicle storage unit 28 is formed as an open box frame structure having upper and lower generally rectangular frames 34 and 35, respectively, that are connected at their four corners by vertical struts 36. Secured, such as by welding, within each storage unit 28 are at least two parallel spaced tracks 38, on which the vehicles are driven into the storage units 28 through the open ends thereof. In the embodiment shown in FIGS. 1-6, two parallel spaced tracks are used. To ensure that the vehicles are secured within the storage units 28, the tracks 38 can include means for securing the vehicles, such as ties, rods, rollers, bars, or the like.

Figure 7:
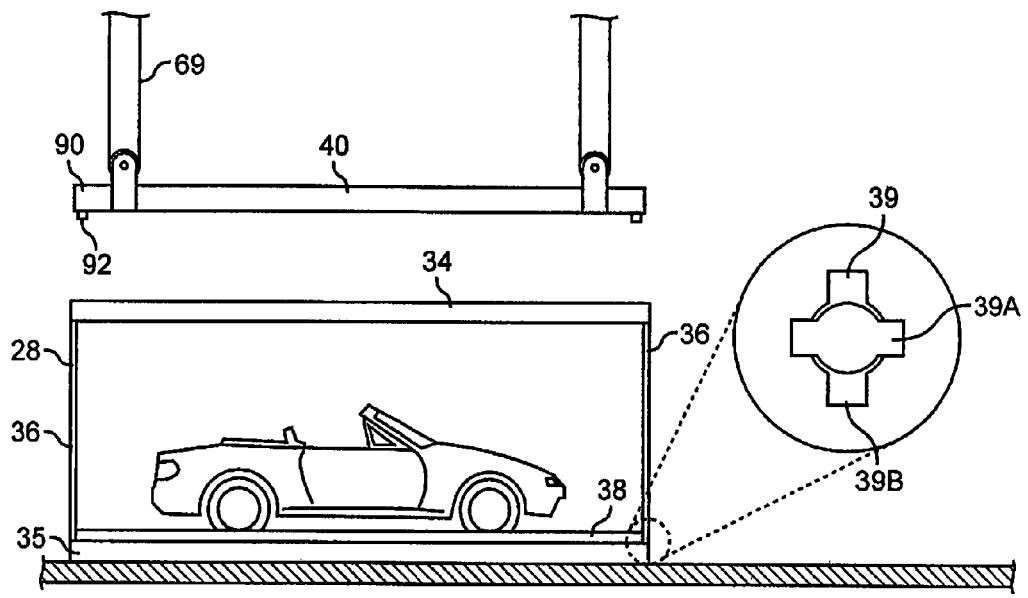
FIG. 7 is a side view of a vehicle storage unit showing a rotating lock in an engaged and locked position.
Figure 8:
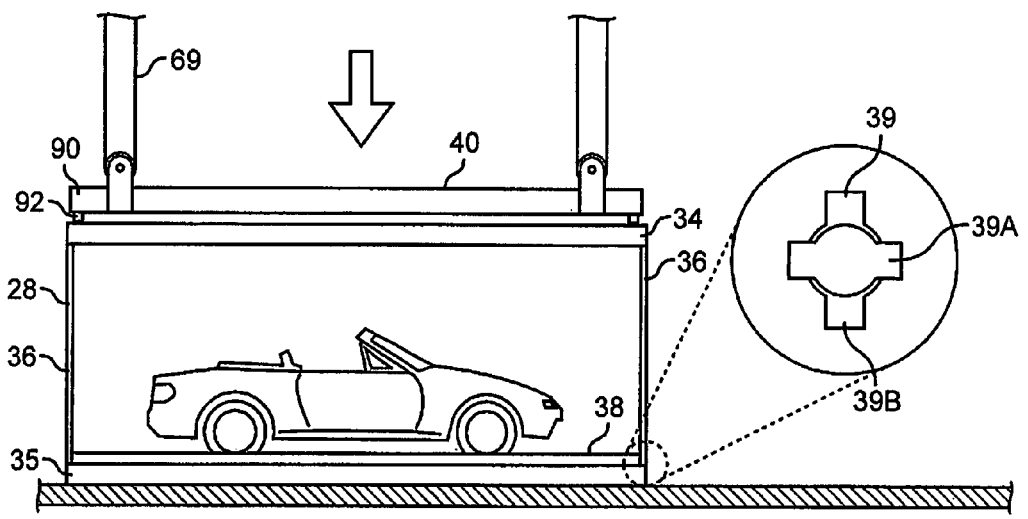
FIG. 8 is view similar to FIG. 7 showing a transfer unit moving downwardly to engage the vehicle storage unity.
Figure 9:
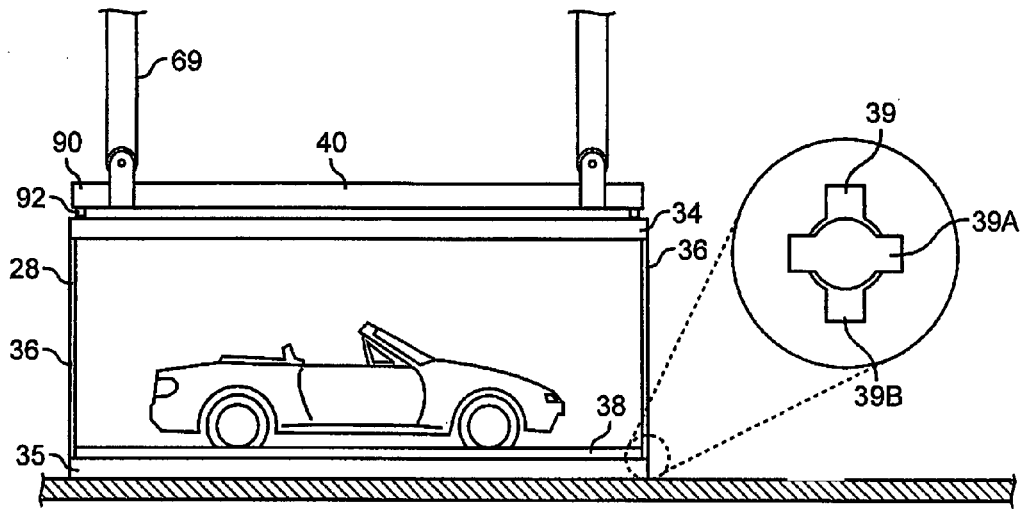
FIG. 9 is a view similar to FIG. 8 showing the transfer unit engaging the vehicle storage unit.
Figure 10:
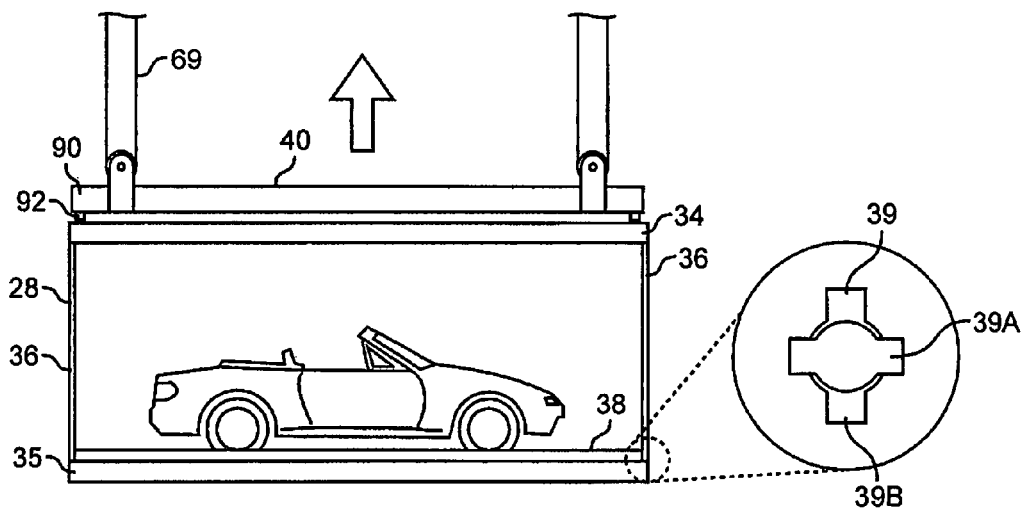
FIG. 10 is a view similar to FIG. 9 showing the transfer unit lifting the vehicle storage unit.

In a preferred embodiment shown in FIGS. 7-12, each vehicle storage unit 28 also includes rotating locks 39 for securing the vertical struts 39 to the lower frame 25. Each rotating lock 39 comprises a key 39A and a corresponding opening 39B. Preferably, the key 39A includes two opposing tabs, and the opening 39B includes two opposing slots for receiving the tabs. To engage the rotating lock 39, the key 39A is aligned with and inserted into the opening 39B. The key 39A is then rotated so that the shape of the key 39A no longer aligns with the shape of the opening 39B, as shown in FIGS. 7-8. Likewise, to release the rotating lock 39, the key 39A is rotated until the shape of the key 39A corresponds with the shape of the opening 39B, and then the key 39A is removed from the opening 39B, as shown in FIGS. 9-10. As a result of the rotating locks 39, the vertical struts 36 and the upper frame 34 can be released from the lower frame 35 of a vehicle storage unit 28 so that a vehicle can easily drive into or out of the storage unit 28.

Although most of the vehicle storage units 28 are shown in the drawings as open frame structures that are preferably made of steel or similar metal, it is possible that the storage units 28 may be substantially enclosed on the bottom, sides and top thereof. However, it is preferred that sufficient openings are provided in the enclosed storage unit walls to permit air flow there through so as to prevent any development of mold or mildew.

The vehicle storage units 28 are reinforced as necessary, depending upon the size and weight of vehicles that are to be stored therein. Also, by providing additional or adjustable tracks 38 within the storage units 28, vehicles of different sizes may be selective stored therein. Further, the vehicle storage units 28 are designed to be vertically stacked upon one another, as shown in FIGS. 1-6.

The vehicle storage units 28 are designed to be manipulated by overhead transfer units 40, as shown in detail in FIGS. 13-17, with one such unit 40 being shown in FIG. 1. Each unit 40 includes a body, which in the embodiment shown, includes a rectangular steel frame 42 that is supported at each of the four corners thereof by support or pilot hanger shafts 43 that extend upwardly from the frame and through open slots 44 that are provided in an overhead track system 45.

The track system 45 is formed by a plurality of hollow steel box beams 46 that are welded or otherwise secured to steel girders or roofing "I" beams of the structure 20 so that the open slots 44 are oriented downwardly. The track system 45 extends above the periphery of the warehouse structure 20 in such a manner that the transfer units 40 may be directly and selectively aligned so as to carry and place a vehicle and a vehicle storage unit 28. Load bearing flanges 47 are formed on opposite sides of the slots, on which track roller carriages 48 are movably supported. Each of the pilot hanger shafts 43 is centrally secured to a separate roller carriage 48.

The box beams 46 that form the track system 45 include both longitudinally extending sections 46A and transverse sections 46B that are oriented at generally right angles with respect to one another. The roller carriages include both upper and lower heavy duty roller ball sets 49 and 50, respectively, that guide the carriages within the box beams 46 with the lower set bearing the weight of the transfer units 40 and the vehicle storage units 28 and the vehicles stored therein. Alternatively, the roller carriages can only include a lower heavy duty roller ball set 50 for guiding the carriages within the box beams 46. Each carriage also includes two pair of wheel sets 51 and 52, with the wheel sets 51 engaging the flanges 47 of the longitudinal sections 46A and the wheel sets 52 engaging the flanges 47 of the transverse sections 46B.

Figure 14:
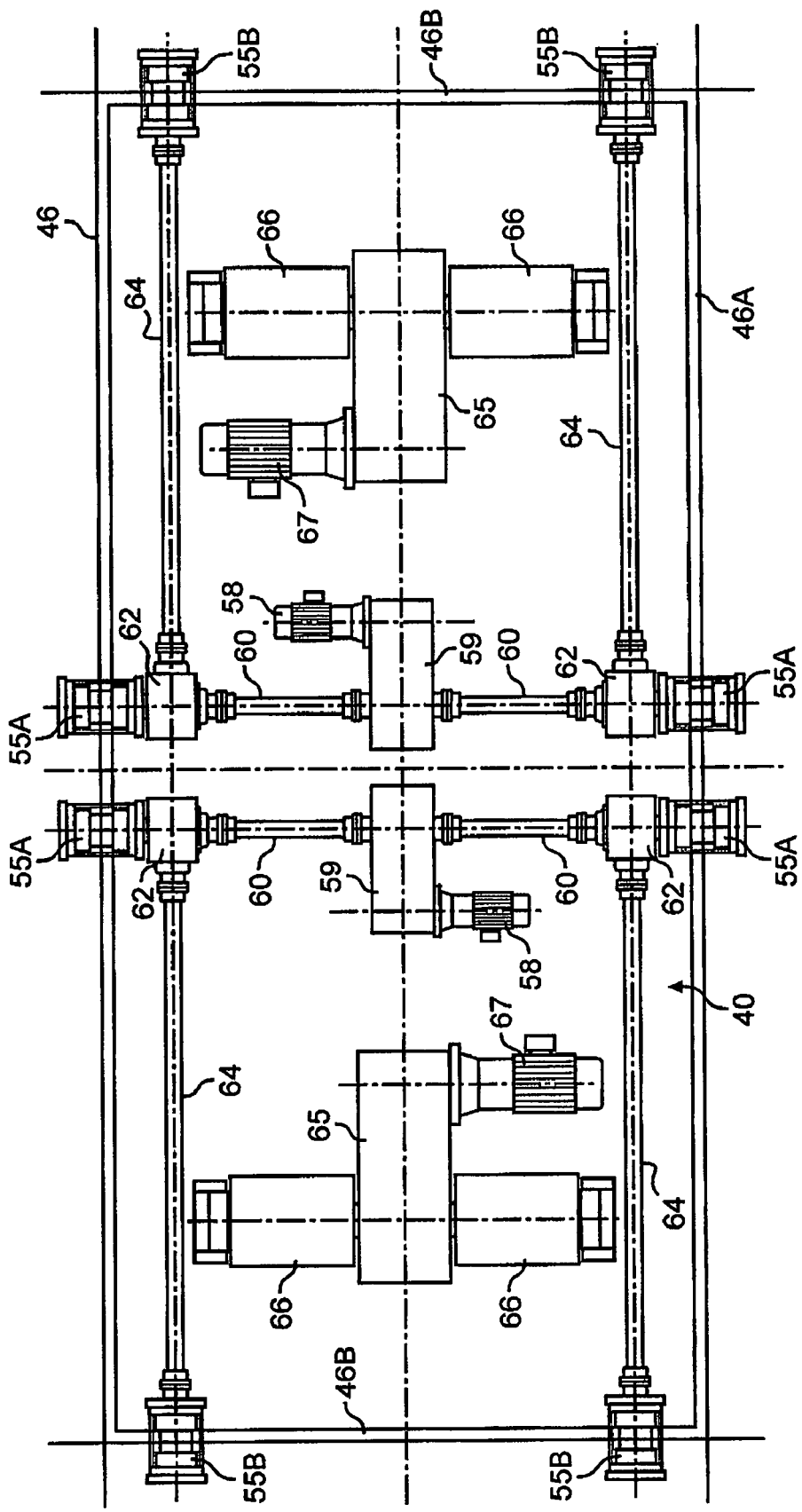
FIG. 14 is a top plan view of the transfer unit of FIG. 13 showing portions of gear racks associated with an overhead guide track system superposed over drive pinions of the transfer unit.
Figure 15:
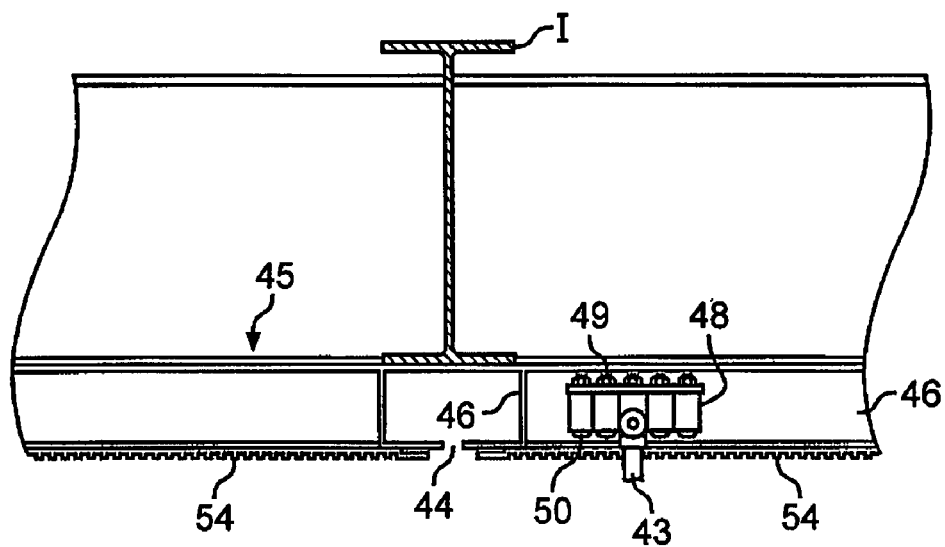
FIG. 15 is a partial cross sectional view through an intersecting section of the overhead tracks of the invention and showing a side view of one of the roller assemblies that support the transfer units of the invention.
Figure 16:
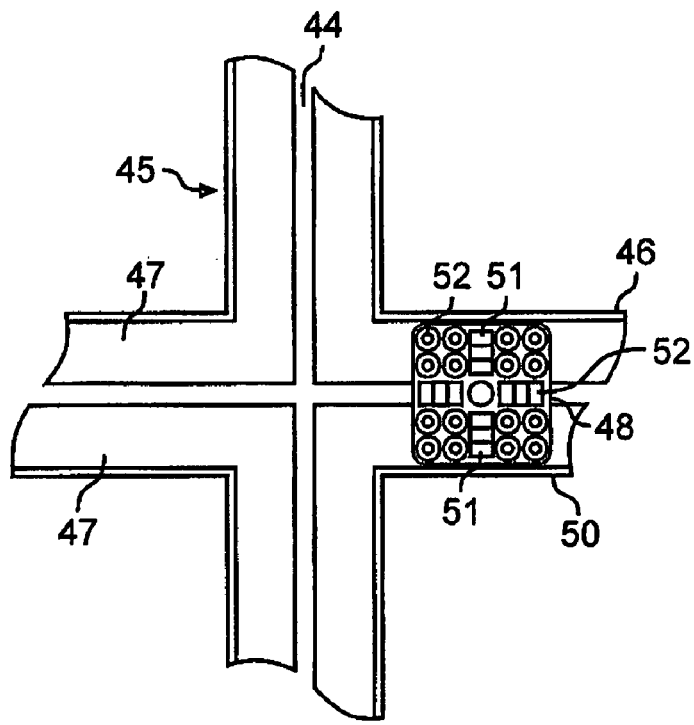
FIG. 16 is a partial top plan view of FIG. 15, showing the intersecting section of the overhead tracks of the invention and one of the roller assemblies that support the transfer units of the invention.
Figure 17:
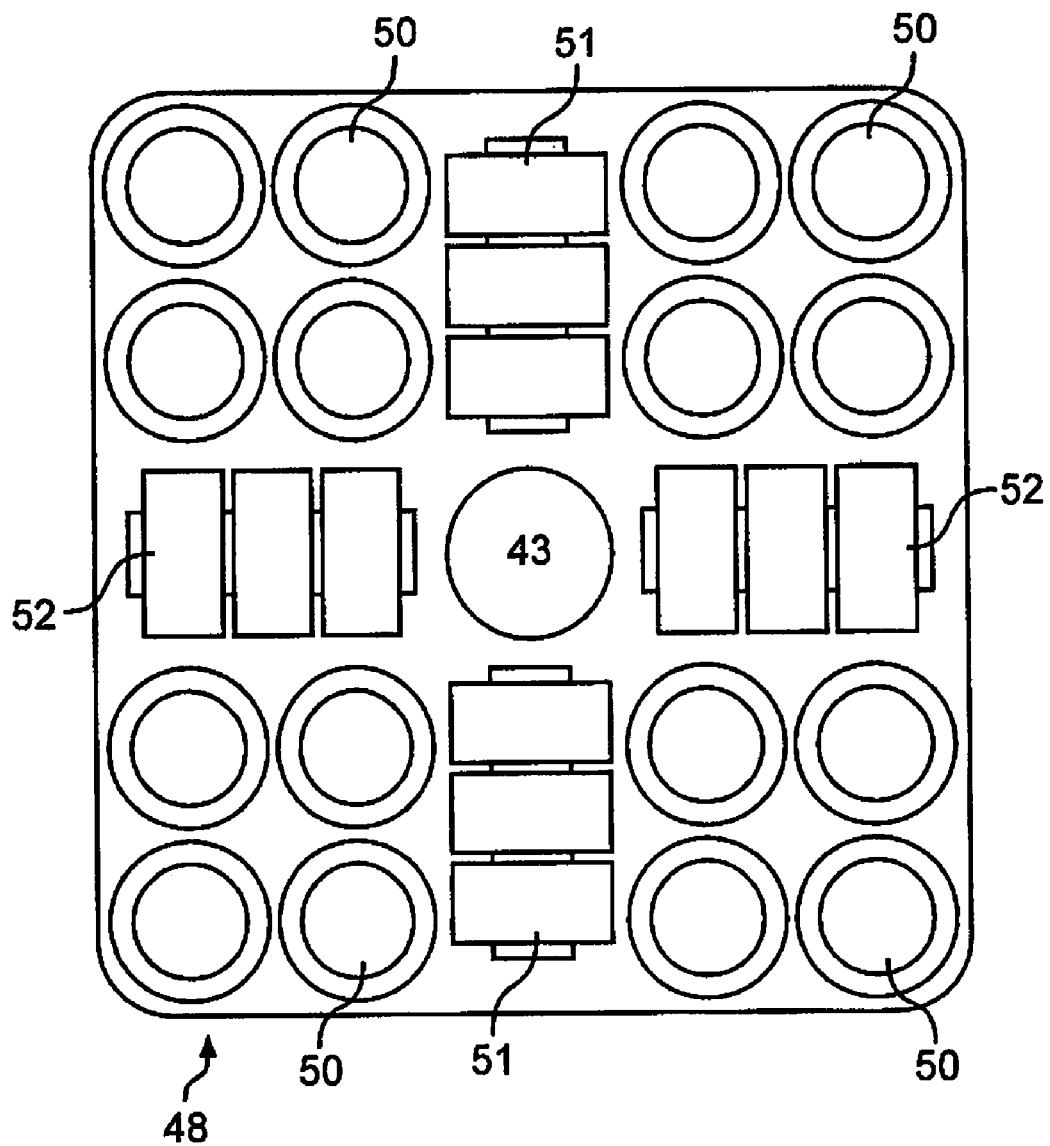
FIG. 17 is a bottom view of one of the roller assemblies of the invention which support the transfer units from the guide tracks.

The lower surfaces of each of the track sections 46A/B are provided with gear racks 54 with which drive pinion gears 55A and 55B of drive assemblies carried by the transfer units 40 are in meshed engagement. With specific reference to FIG. 14, each transfer unit 40 includes eight drive pinion gears 55A/B, two on each side of the frame 42 that are engaged with the gear racks 54. FIG. 14 is a top plan view of the transfer unit 40 showing four gear track sections 46 superimposed over the drive pinion gears 55A/B with two of the sections being the longitudinal track sections 46A and two being the transverse sections 46B. Two drive motors 58 are mounted to the transfer unit 40 having outputs connected through power splitters 59 that drive first output drive shafts 60 that drive the pinion gears 55A through four gear boxes 62. Secondary drive output shafts 64 extend from the gear boxes 62 to the drive pinion gears 55B. In this manner, all the drive pinion gears 55A/B are uniformly driven at the same rate by the two drive motors 58. The gear boxes 62 are controlled such the drive output is only possible to either the pinion gears 55A or 55B at any one time such that to move the transfer unit 40 longitudinally along the track system 46 from the back of the structure 20 toward the front thereof, only the drive pinion gears 55A are powered and such that, when the transfer unit 40 is to move transversely from side-to-side along the track system 46, only the drive pinions 55B are powered.

Figure 18:
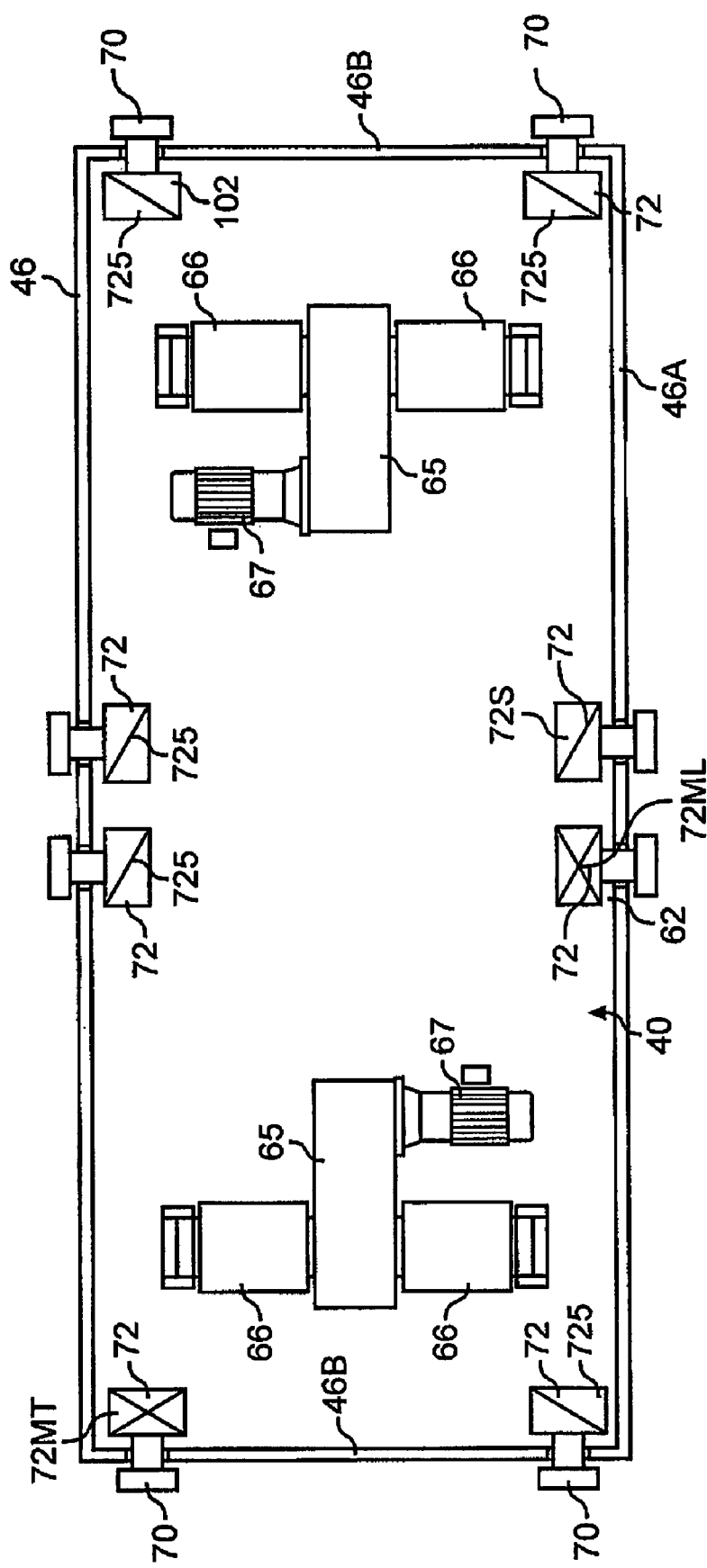
FIG. 18 is a top plan view of an alternative embodiment of the transfer unit of FIG. 13 showing portions of segments of an overhead guide track system superposed over rubber drive wheels of the transfer unit.

In an alternative embodiment shown in FIG. 18, the transfer unit 40 can be provided with rubber drive wheels 70 instead of the gear racks 54 and the drive pinion gears 55A/B. FIG. 18 is a top plan view of the transfer unit 40 showing four gear track sections 46 superimposed over the rubber drive wheels 70 with two of the track sections being the longitudinal track sections 46A and two being the transverse sections 46B. Drive motors 72 are attached to each of the rubber drive wheels 70. The drive motors 72 are controlled by a master encoder 72ML on one of the drive motors 72 along one of the longitudinal track sections 46A and another master encoder 72MT on one of the drive motors 72 along one of the transverse track section 46B. The master controllers 70ML and 70MT control slave encoders 72S on the other drive motors 72. In this manner, the drive motors 70 are controlled such that to move the transfer unit 40 longitudinally along the track system 46 from the front of the structure 20 to the back thereof and vice versa, the master encoder 72ML controls the drive motors 72 along the longitudinal track sections 46A. Likewise, to move the transfer unit 40 transversely along the track system 46 from one side of the structure 20 to the opposite side and vice versa, the master encoder 72MT controls the drive motors 72 along the transverse track sections 46B.

Figure 3:
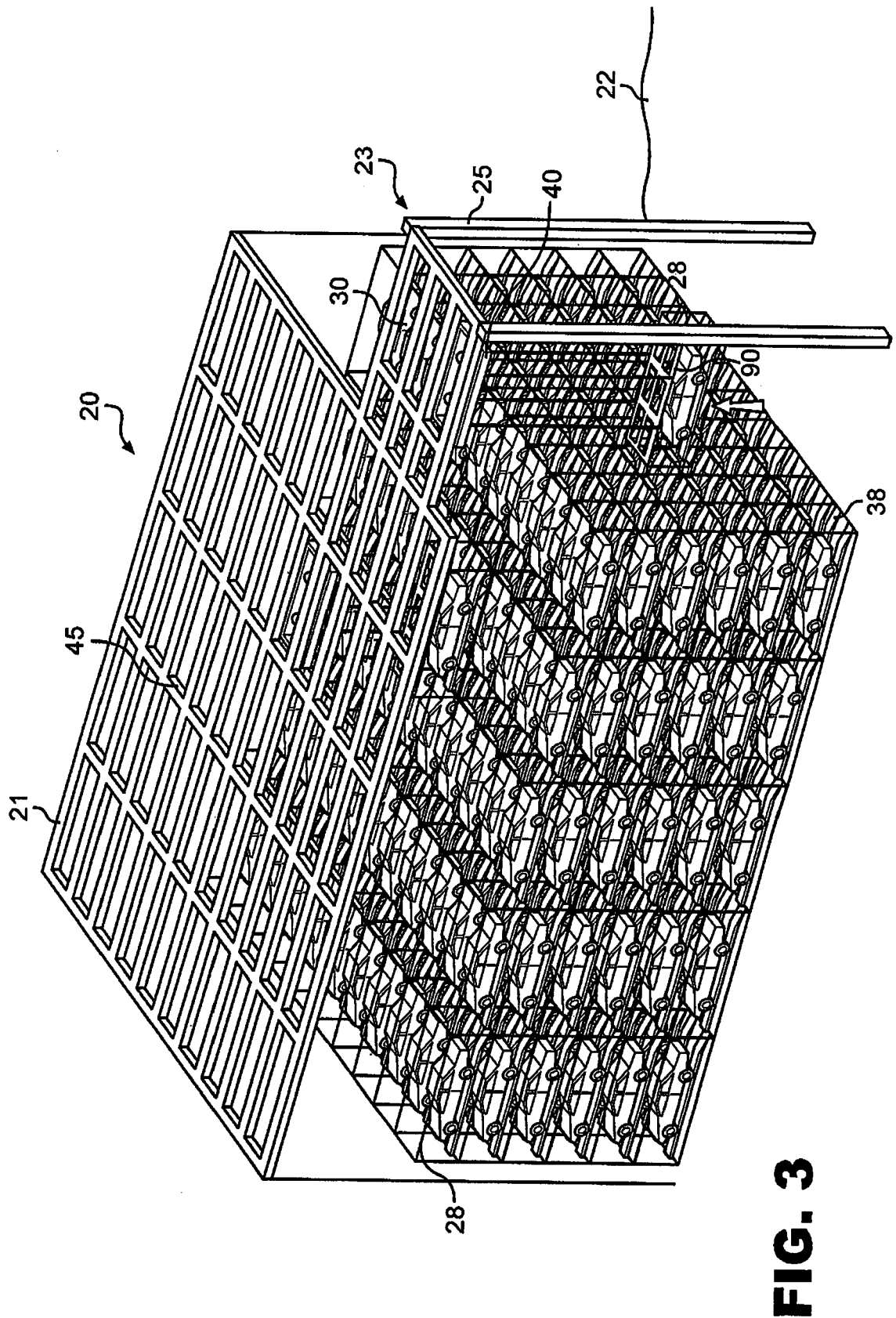
FIG. 3 is a view similar to FIG. 1 showing the vehicle being elevated by the specialized overhead lift and transfer unit of the invention.
Figure 4:
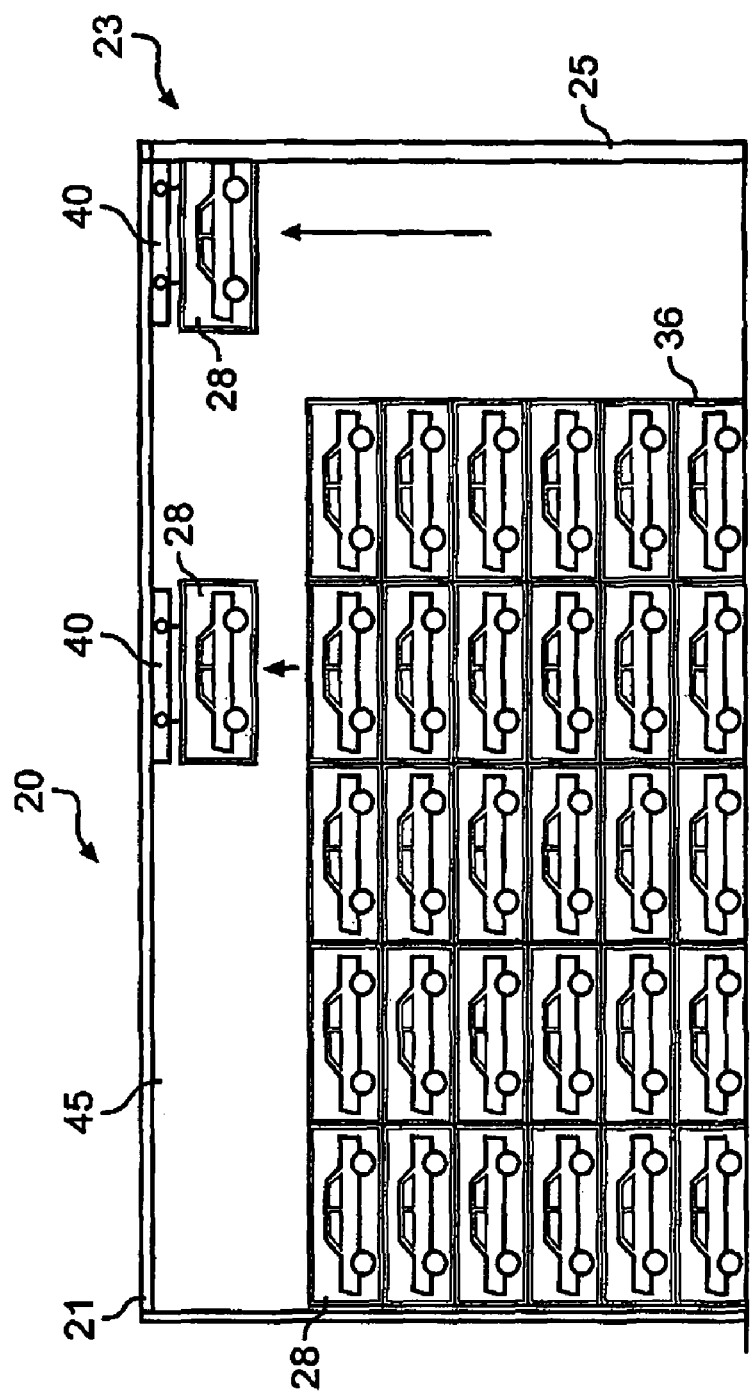
FIG. 4 is a side view on a reduced scale showing two vehicles being completely elevated adjacent an overhead track system with one being carried by a first transfer unit into the storage area and a the other being transferred out of the facility on its way to be returned to the owner.
Figure 5:
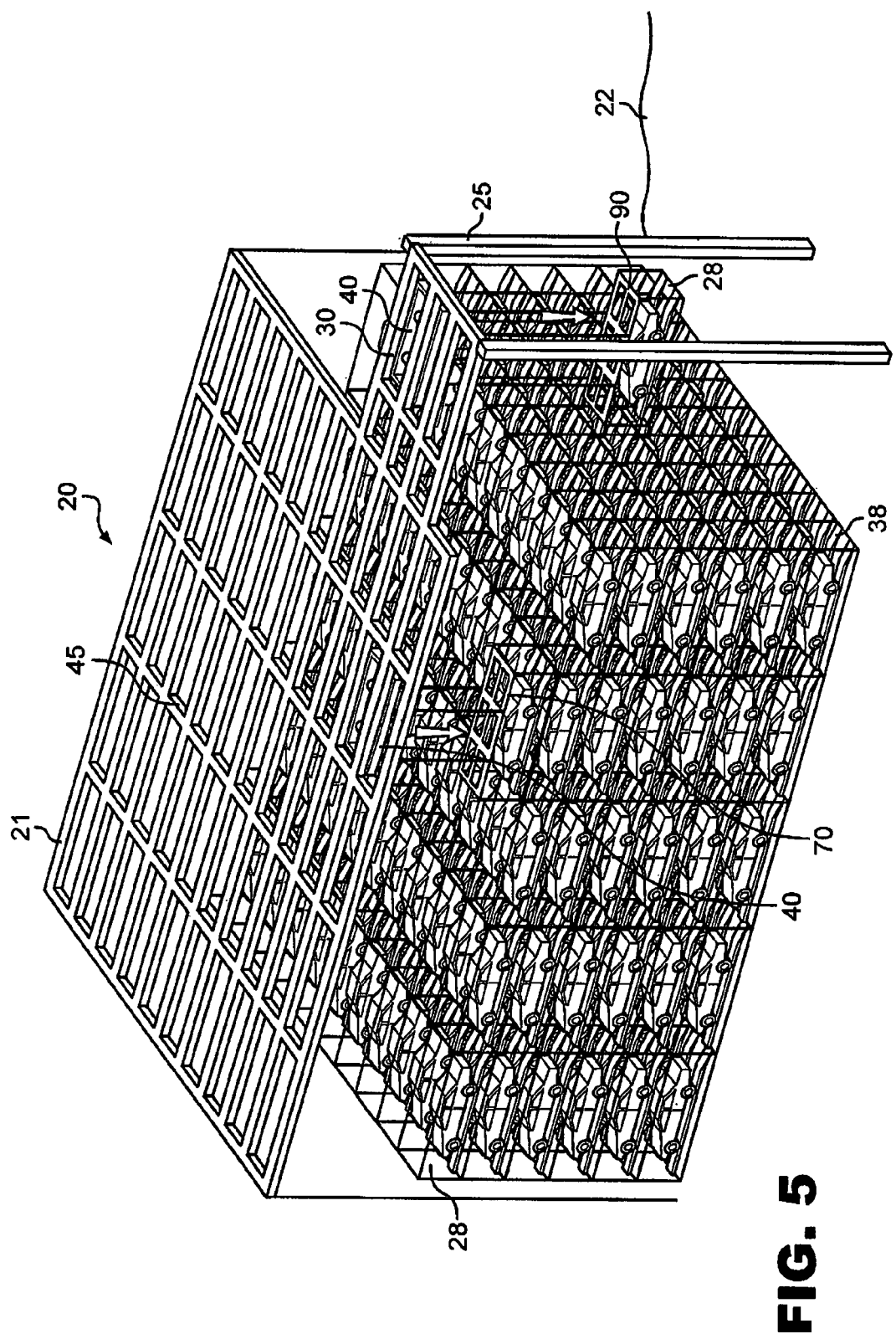
FIG. 5 is a perspective view showing the one vehicle being lowered onto a stack of storage units or racks with the facility and the other being lower to the owner.
Figure 6:
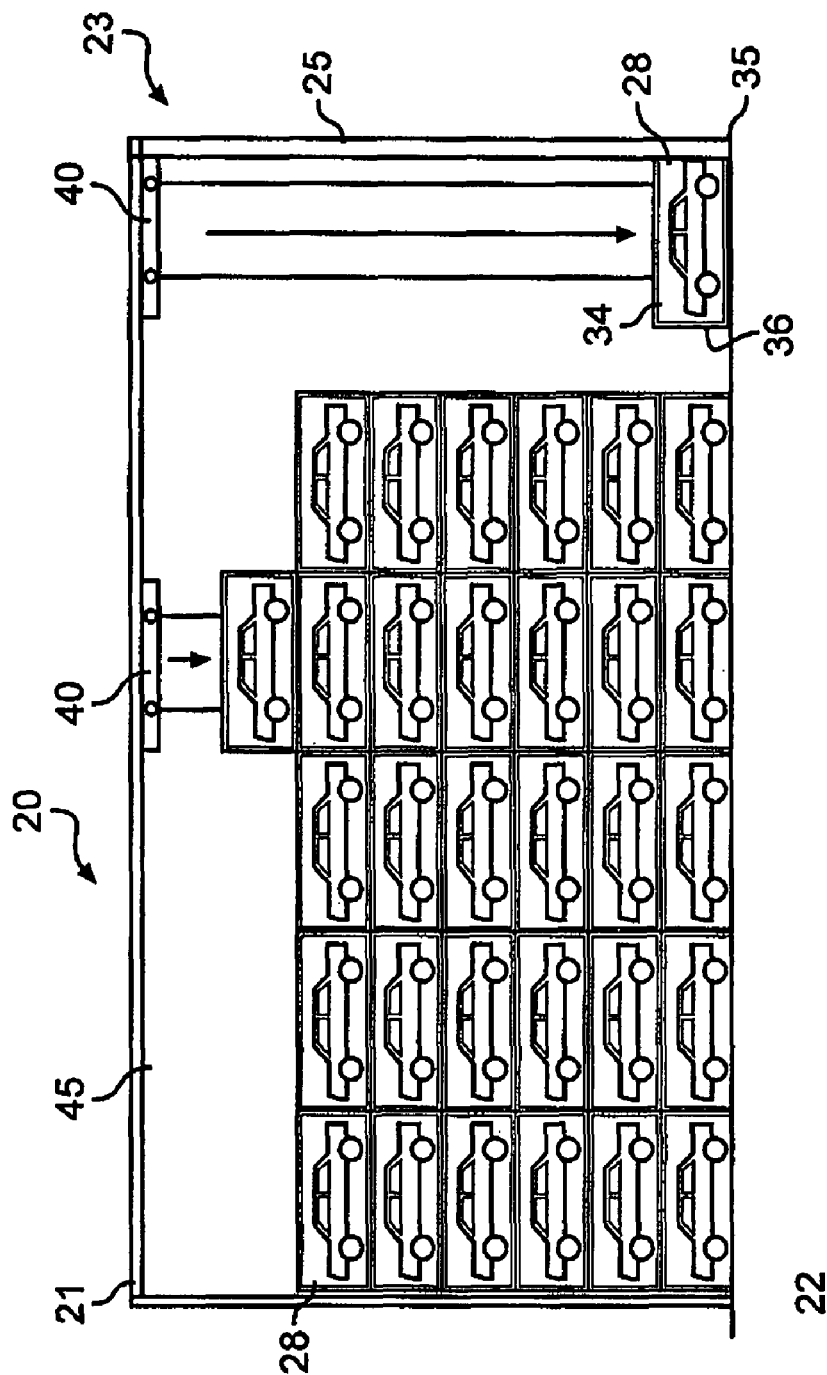
FIG. 6 is a side view on a reduced scale of the perspective view of FIG. 5.
Figure 13:
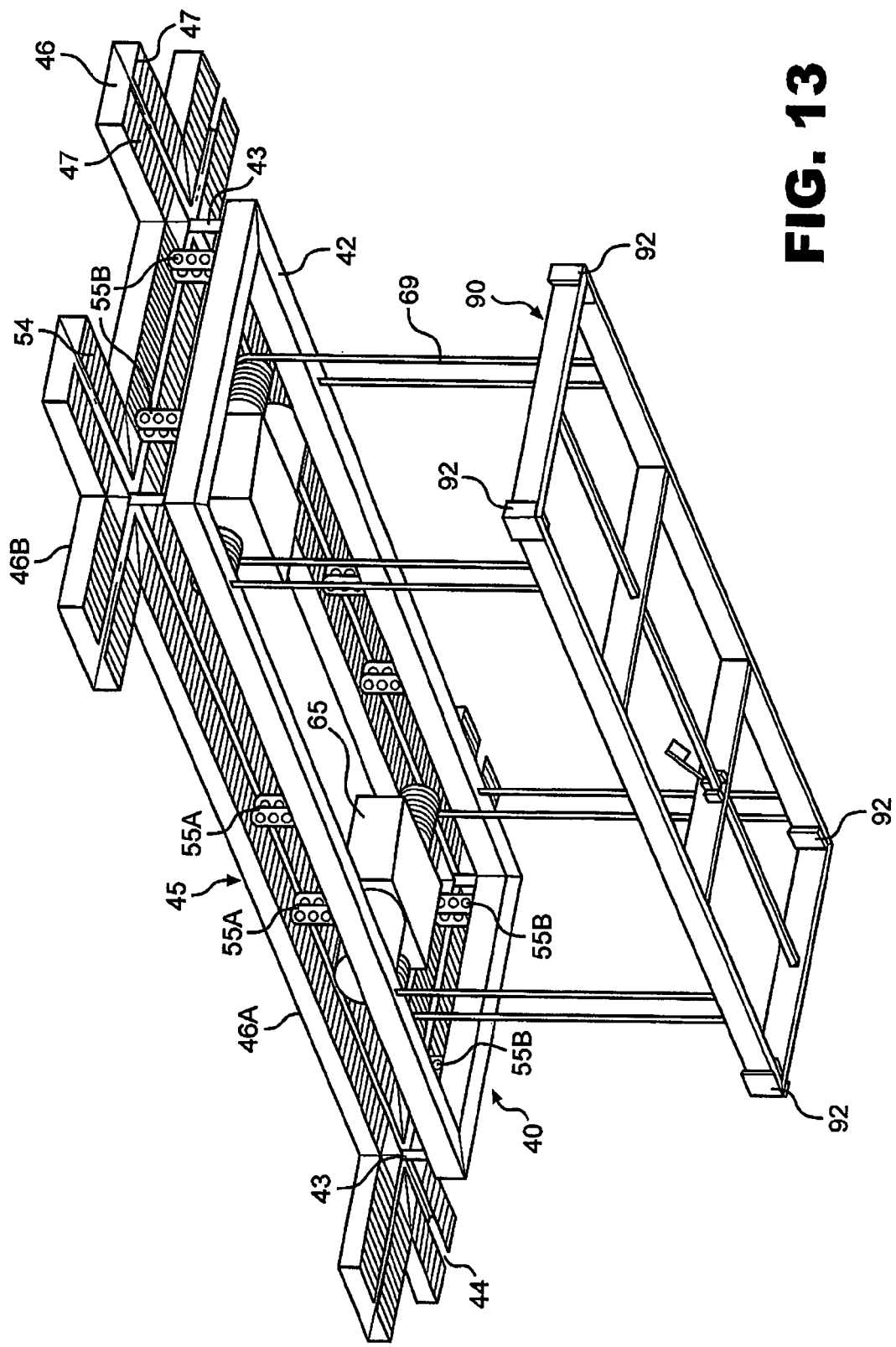
FIG. 13 is a perspective view of one of the transfer units of the invention shown suspended from intersecting sections of overhead tracks along which the transfer units are selectively movable in both "X" and "Y" directions and also illustrating a suspension frame for cooperatively engaging and securing one of the storage units of the invention as the storage units are moved about the system and storage facility of the invention.

The transfer units 40 are designed to raise and lower the vehicle storage units 28 of the invention. To accomplish this, two independently controllable hoist motors 64 are mounted to the transfer units 40. The outputs from the motors 64 are connected through power splitters 65 to pairs of winding drums 66. Cables 69, as shown in FIG. 13, depend from the drums 66 to lower ends that are fixed to a lifting frame 90 that functions as a spreader beam to being in locked engagement with an upper portion of one of the vehicle storage units 28. As the lifting frame 90 is lowered toward an underlying vehicle storage unit 28, by activation of the motors 64, the frame 90 will engage about the upper periphery of the vehicle storage unit 28, after which, corner locks 92 are automatically tripped to engage the vehicle storage unit 28 such that the unit 28 can be elevated to a position immediately adjacent the transfer unit 40, as illustrated in FIG. 3. In this position, the transfer unit 40 can be moved along the track sections 46A and 46B so as to move the vehicle and the vehicle storage unit 28 above a desired position.

Figure 21:
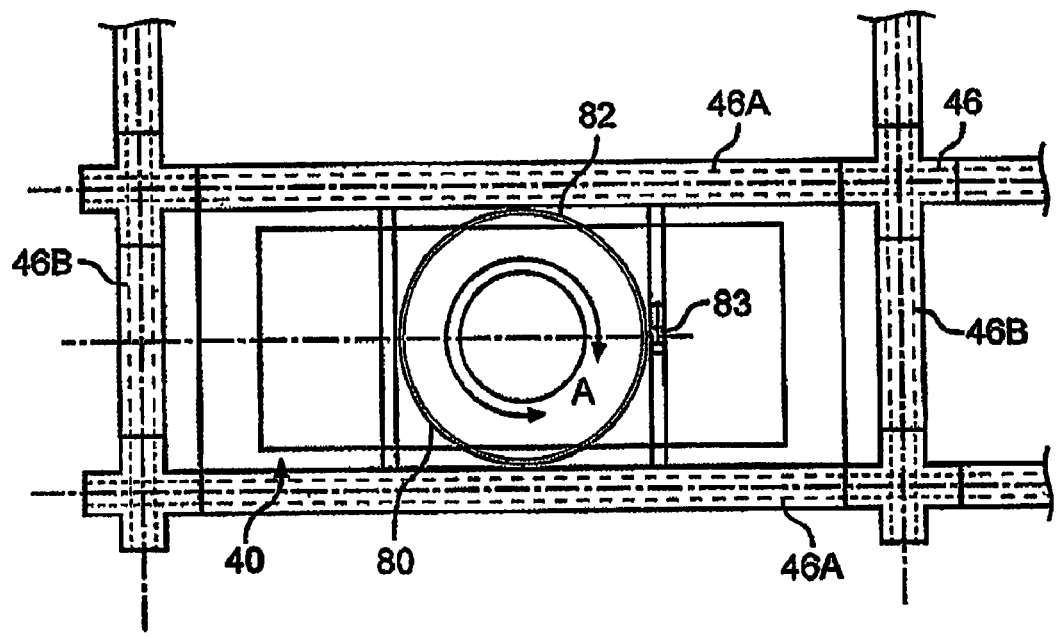
FIG. 21 is a top view similar to FIG. 19.
Figure 22:
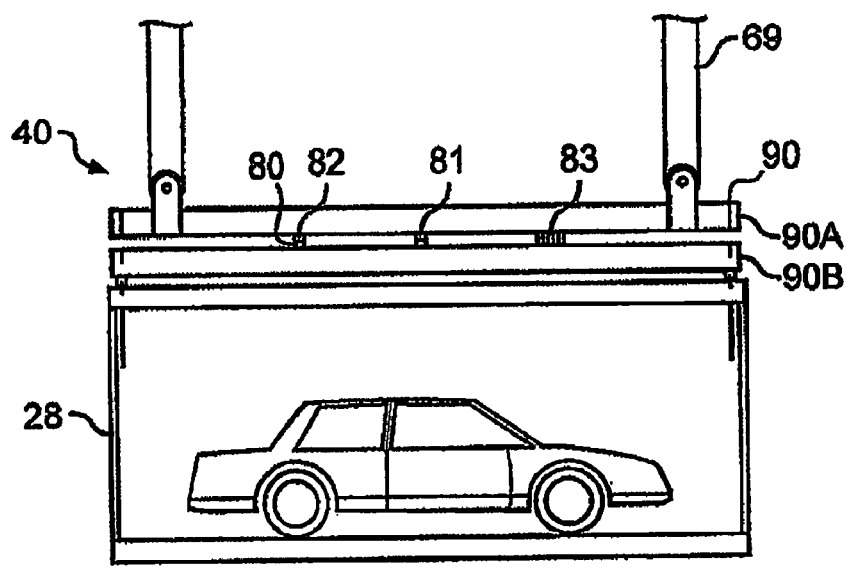
FIG. 22 is a side view illustrating a vehicle storage unit suspended from the transfer unit of FIG. 19.

In a particular embodiment, the transfer unit 40 also includes a trunnion 80 that allows the vehicle storage unit 28 to be rotated so that the vehicle stowed therein can face a desired direction. With specific reference to FIGS. 21-22, the trunnion is fixed to an upper frame 90A of the lifting frame 90. The trunnion 80 includes a pivot point 81 that is surrounded by a circular track 82. A trunnion motor 83 allows a lower frame 90B of the lifting frame 90 to move along the circular track 82 so that the lower frame 90B rotates relative to the upper frame 90A. Subsequently, the trunnion 80 also rotates the vehicle storage unit 28 relative to the upper frame 90A of the transfer unit 40 until the vehicle storage unit 28 is positioned in a certain direction. Once the vehicle storage unit 28 is located above a desired positioned and faced in a certain direction, the vehicle storage unit 28 is lowered until it rests of the floor of the structure 20 or is seated on an underlying storage unit.

In the operation of the storage system of the first embodiment of the invention, a vehicle approaches the open cell space 30 between the two spaced columns 25 along the front portion 23 of the storage building or structure 20. Before the vehicle enters the open cell 30, an overhead transfer unit 40 maneuvers above an empty vehicle storage unit 28 with rotating locks 39 in an engaged and locked position. Once the transfer unit 40 is positioned above the desired storage unit 28, the lifting frame 90 of the transfer unit 40 is lowered onto the vehicle storage unit 28 and engages the storage unit 28 via corner locks 92. The transfer unit 40 then moves along track system 45 until the lifting frame 90 and the empty vehicle storage unit 28 secured thereto is positioned above the empty cell 30. The transfer unit 40 then lowers the lifting frame 90 and the storage unit 28 until the bottom of the vehicle storage unit 28 is flush with a ground surface.

Once the vehicle storage unit 28 is flush with the ground in the open cell 30, the rotating locks 39 are disengaged to release the vertical struts 36 from the lower frame 35 of the storage unit 28. The transfer unit 40 then lifts the upper frame 34 and vertical struts 36 from the lower frame 35 of the vehicle storage unit, and the vehicle is subsequently driven into the storage unit 28 and secured in place on the tracks 38 via the securing means.

When the vehicle is properly resting within the storage unit 28, an operator, preferably with a remote control device, lowers the lifting frame 90 with the upper frame 34 and the vertical struts 36 of the storage unit 28 attached thereto until the vertical struts 36 rest on the lower frame 35 and the keys 39A of the rotating locks 39 engage the openings 39B, as shown in FIGS. 7-8. The locks 39 are rotated into a locked position, and the operator raises the vehicle and storage unit 28 until they are directly beneath the body of the transfer unit 40, as illustrated in FIGS. 9-10. In this position, the vehicle and the storage unit 28 are moved to predetermined location within the inner portion 21 of the building or structure 20. Thereafter the vehicle and storage unit 28 are lowered into stored position.

The system of the present invention can be operated by an operator or operators at the facility, either manually or through the use of computers. Alternatively, the system can be controlled automatically. By way of example, a vehicle owner when contracting for vehicle storage may be given a personal code or a bar coded card that may be entered into a control terminal placed at an accessible site adjacent the area where the vehicles are elevated from the roadway. The control terminal is connected to a computer system that verifies the number of the access or bar code. At the time of verification, the computer signals one of the transfer units having a correct size of vehicle storage unit available to move to the pick up area and lower the storage unit to the roadway. As a vehicle enters the open end of the storage unit, sensors mounted to the lifting frame sense when the vehicle is in proper position. The hoists are subsequently automatically activated to raise the vehicle and the storage unit to a position immediately below the transfer unit. The transfer unit receives storage position information from the computer and automatically moves to a predetermined area or cell with the storage facility and then lowers the vehicle storage unit to a predetermined storage position.

Further, in another alternative embodiment, the vehicle storage system of the present invention also includes means for identifying each vehicle storage unit. Such identification means may include a radio frequency identification system or a bar code system. For example, each vehicle storage unit 28 includes a radio frequency identification tag, and the warehouse structure 20 is equipped with various radio frequency readers. Accordingly, the readers are able to obtain data from the identification tags regarding the position of each storage unit 28 in the warehouse 20. The readers then transfer this information to the computers for analysis and storage.

When it become necessary to retrieve a vehicle from beneath a stack of vehicle storage units 28, one of the transfer units 40 is moved over the appropriate location and the lifting frame 90 is lowered until it automatically locks to an uppermost vehicle storage unit 28. The uppermost storage unit 28 is elevated directly beneath the body of the transfer unit 40, after which the transfer unit 40 is moved above an empty storage space within the structure 20. The vehicle storage unit 28 is then lowered into the space. This process is continued until the desired vehicle storage unit 28 is lifted from the storage area. Further, the vehicle storage unit 28 may be rotated via the trunnion 80 so that the vehicle faces a certain direction.

Figure 11:
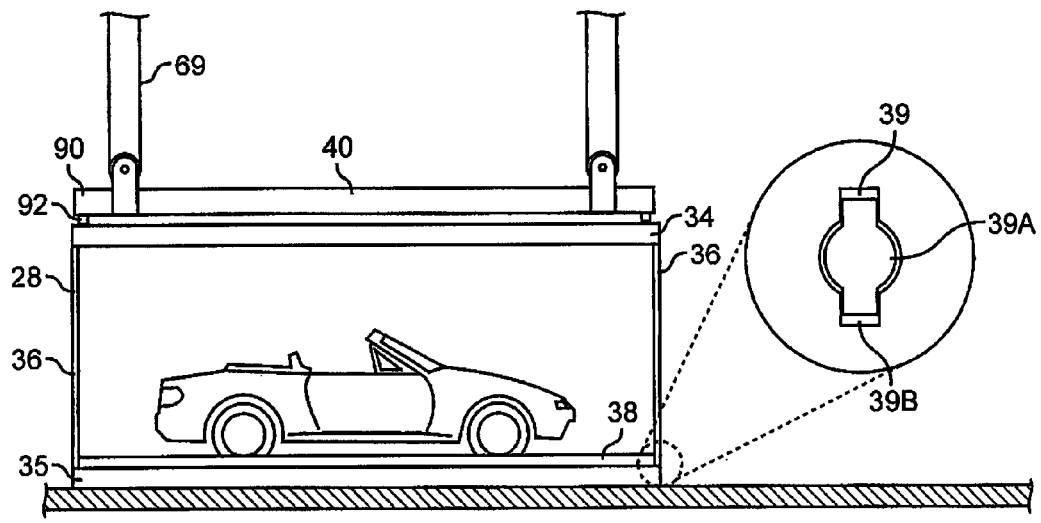
FIG. 11 is a side view of a vehicle storage unit engaged with a transfer unit showing a rotating lock in an engaged and locked position.
Figure 12:
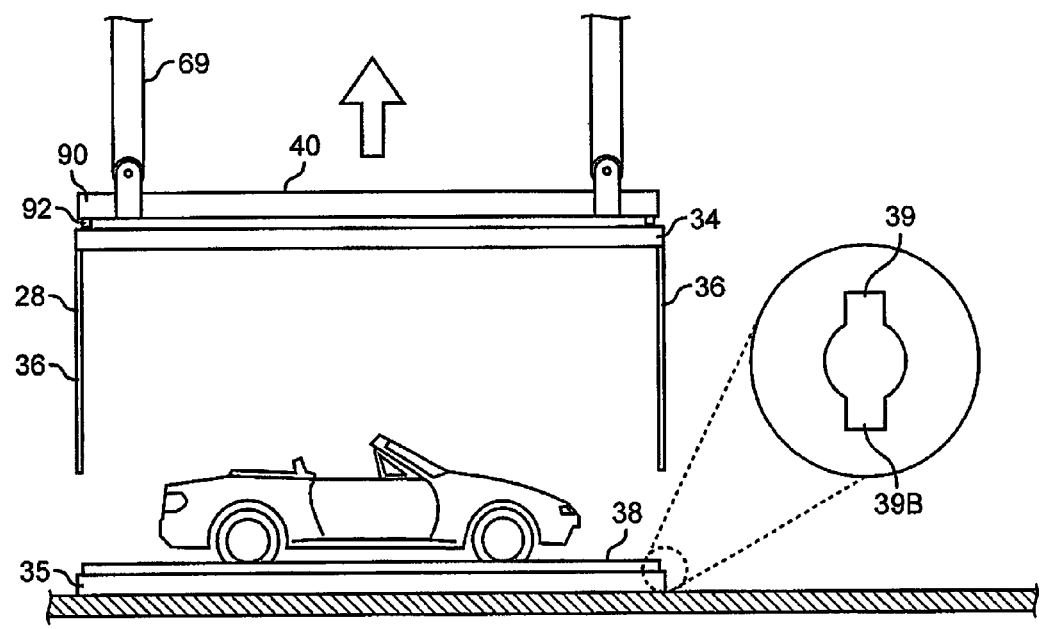
FIG. 12 is a view similar to FIG. 11 showing the rotating lock in a disengaged position so that the transfer can lift an upper frame and vertical struts from a lower frame of the vehicle storage unit.

Once the desired vehicle storage unit 28 is lifted from the storage area, the transfer unit 40 moves along the overhead track system 45 until the transfer unit 40 and the storage unit 28 are positioned above the open cell 30 of the front portion 23 of the structure 20. The transfer unit 40 then lowers the lifting frame 90 and the storage unit 28 until the bottom of the vehicle storage unit 28 is flush with the ground surface. After the vehicle storage unit 28 is flush with the ground in the open cell 30, the rotating locks 39 are disengaged to release the vertical struts 36 from the lower frame 35 of the storage unit 28, as shown in FIG. 11. The transfer unit 40 then lifts the upper frame 34 and vertical struts 36 from the lower frame 35 of the vehicle storage unit so that the vehicle can be removed from the storage unit 28, as shown in FIG. 12.

The foregoing description of the present invention has been presented to illustrate the principles of the invention and not to limit the invention to the particular embodiments illustrated. It is intended that the scope of the invention be defined by all of the embodiments encompassed within the following claims and their equivalents.

We claim:

1. An overhead vehicle storage system for selectively elevating vehicles from a roadway, storing the vehicles within a storage facility and retrieving the vehicles from the storage facility, the storage system comprising; a storage structure including a first section for storing a plurality of storage units and a second section extending over the roadway, an overhead track system including a plurality of first spaced and parallel track sections that extend in a first direction from first ends thereof to opposite ends thereof above said first section of said storage structure, a plurality of second spaced and parallel track sections that extend in a second direction that is substantially perpendicular to the first direction from first ends thereof to opposite ends thereof, said first and second track sections intersecting substantially perpendicularly with one another at a plurality of open intersections that are spaced from one another to form a uniform X-Y system of tracks above the first section of said storage structure, at least one pair of third spaced and parallel tracks that extend over the roadway and which are aligned with at least one pair of said first or second track sections, at least one powered transfer unit mounted to said overhead track system, said at least one transfer unit including support carriages that are movable along pairs of said first track sections and said second track sections so that said at least one transfer unit is movable transversely in an X-Y motion above said first section of said storage structure and along at least one of an X or Y direction over said second section of said storage structure, a plurality of vehicle storage units each including a frame supporting a vehicle support onto which a vehicle may be driven and upper lock receivers, said at least one transfer unit including hoist means for selectively raising and lowering a lifting frame which includes lock members which are selectively locked to the lock receivers of said vehicle storage units, and said vehicle storage units being vertically stackable one above another within said first section of said storage structure, whereby said at least one transfer unit can be maneuvered in X-Y directions along said overhead track system after a vehicle has been positioned within a storage unit and the storage unit raised into close proximity to the transfer unit.

2. The overhead vehicle storage system of claim 1 wherein said second section of said storage structure includes at least two spaced column structures that are secured to said at least one pair of third spaced and parallel tracks, said at least two spaced columns defining a space therebetween of a size to permit one of said vehicle storage units to be lowered therebetween to permit a vehicle to be loaded onto or removed from the vehicle storage unit, and guide means extending between said at least two spaced column structures and said at least one pair of third tracks of said overhead track system to thereby guide the vehicle storage unit as the vehicle storage unit is raised and lowered relative to the space between said at least two spaced column structures.

3. The overhead vehicle storage system of claim 2 wherein said guide means includes at least one set of four vertical columns that extends between said at least two spaced column structures and said at least one pair of third tracks of said second section of said storage structure.

4. The overhead vehicle storage system of claim 1 wherein said at least one pair of third spaced and parallel tracks includes pairs of tracks that intersect generally perpendicularly with one another.

5. The overhead vehicle storage system of claim 1 wherein said frame of each of said vehicle storage units includes upper and lower generally rectangular frame members connected by at least four vertical frame members and between which a vehicle may be seated upon said vehicle support and such that said vehicle storage units may be vertically stacked one upon another.

6. The overhead vehicle storage system of claim 5 wherein each of said vehicle storage units includes a rotatable lock for securing said vertical frame members to said lower frame member.

7. The overhead vehicle storage system of claim 5 wherein said frame of each of said vehicle storage units is generally open at least at one end thereof to thereby permit a vehicle to be loaded onto and from said at least one vehicle support.

8. The overhead vehicle storage system of claim 7 wherein at least one of said vehicle storage units is substantially enclosed by wall portions to thereby protect a vehicle in storage from damage.

9. The overhead vehicle storage system of claim 5 wherein said vehicle support includes at least two spaced parallel tracks and securing means for securing a vehicle stored within a vehicle storage unit.

10. The overhead vehicle storage system of claim 1 wherein said at least one transfer unit includes rotating means for rotationally supporting said hoist means therefrom.

11. The overhead vehicle storage system of claim 1 wherein said plurality of vehicle storage units includes vehicle storage units of different sizes for accommodating vehicles of different sizes.

12. The overhead vehicle storage system of claim 1 including controlling means for automatically electronically controlling the storage and/or the retrieval of vehicles relative to said first and second sections of said storage structure, said controlling means including electronic means for identifying a vehicle storage unit and activating means for activating said at least one transfer unit to appropriately store or retrieve from storage an identified vehicle storage unit.

13. The overhead vehicle storage system of claim 1 wherein said first section of said storage structure has a plurality of vertically oriented storage cells for storing said vehicle storage units in a vertically stacked relationships to each other.

14. A method for storing vehicles in a protected storage structure having a first section in which vehicle storage units in which vehicles are housed may be vertically stacked relative to one another and a second section from which vehicles may be elevated from or returned to a roadway and wherein the vehicle storage units are selectively raised, lowered and maneuvered within the storage structure using at least one transfer vehicle that is movable along an overhead grid track system including first and second track sections that extend above the first and second sections of the storage structure and wherein the first section includes a plurality of first spaced and parallel tracks that extend in a first direction from first ends thereof to opposite ends thereof above the first section of said storage structure and a plurality of second spaced and parallel tracks that extend in a second direction that is substantially perpendicular to the first direction from first ends thereof to opposite ends thereof and wherein the first and second tracks intersect substantially perpendicularly with one another at a plurality of open intersections that are spaced from one another to form a uniform X-Y system of tracks above the first section of the storage structure, and wherein the second track section includes at least one third pair of spaced and parallel tracks that are aligned with a pair of one of the first and second spaced and parallel tracks, and which transfer vehicle includes a hoist means including means for engaging one of the vehicle storage units, the method including the steps of:

A. Moving the at least one transfer unit along the overhead grid track system so as to be within the second section of the storage structure above the roadway and thereafter lowering a vehicle storage unit carried thereby onto the roadway;
 B. Moving a vehicle into the lowered vehicle storage unit so as to rest on a vehicle support defined within the vehicle storage unit;
 C. Elevating the vehicle storage unit so as to be more closely spaced to the at least one transfer vehicle;
 D. Maneuvering the at least one transfer vehicle along the at least one third pair of spaced and parallel tracks in at least one of an X or Y direction over the second section of the storage structure and thereafter in an X-Y motion along pairs of the first and second tracks above the first section of the storage structure so that the at least one transfer vehicle moves in first and second intersecting and generally perpendicular directions along the overhead grid track system until being above a predetermined storage area in the first section of the storage structure; and
 E. Lowering the vehicle storage unit being stored in the predetermined storage area and releasing the vehicle storage unit from the at least one transfer vehicle.

15. The method of claim 14 including additional steps of:
 F. Retrieving a vehicle within the vehicle storage unit by moving the at least one transfer vehicle in first and second intersecting and generally perpendicular directions along the pairs of first and second tracks of the overhead grid track system and above the predetermined storage area and lowering the hoist means to engage the vehicle storage unit and locking the hoist means to the vehicle storage unit;
 G. Elevating the engaged vehicle storage unit and thereafter moving the at least one transfer vehicle along the first section of the overhead grid track system to the second section of the overhead grid track system over the second section of the storage structure; and H. Lowering the vehicle storage unit onto the roadway and moving the vehicle stored therein from the vehicle storage unit.

16. The method of claim 15 including additional steps of electronically accessing an electronic control device for controlling movement of the at least one transfer vehicle and electronically requesting the retrieval of a predetermined vehicle or vehicle storage unit, whereupon the receipt of a retrieval request, the at least one transfer vehicle automatically retrieves the requested vehicle storage unit and transfers the retrieved vehicle storage unit to a requested location.

17. The method of claim 16 including additional steps of placing an identifying means for electronically identifying each of the vehicle storage units on the vehicle storage units and providing remote readers for communicating with the identifying means whereby the location of each vehicle storage unit is determined.

18. The method of claim 15 including an additional step of positively guiding the vehicle storage unit as it is raised and lowered relative to the roadway.

19. The method of claim 14 including an additional step of securing a vehicle within the vehicle storage unit before the steps of elevating the vehicle storage unit and maneuvering the vehicle storage unit along the overhead grid track system within the first section of the storage structure.

* * * * *